Patented Aug. 4, 1942

2,291,608

UNITED STATES PATENT OFFICE 2,291,608

MONOCALCIUM PHOSPHATE AND PROCESS FOR PRODUCING THE SAME

William W. Cobbs, deceased, late of Dayton, Ohio, by W. Walker Lewis, Jr., administrator, Dayton, Ohio, and Carroll A. Hochwalt, Rahn Road, Ohio, assignors to Monsanto Chemical Company, a corporation of Delaware No Drawing. Application May 10, 1941, Serial No. 392,934

18 Claims. (Cl. 99—95)

This invention relates to improved chemical leavening acids of the calcium phosphate type.

Monocalcium orthophosphate has been known and used as a leavening agent and baking acid for many years. As ordinarily prepared in the hydrated form it contains one molecule of water, possesses rapid solubility and reacts rapidly with alkaline bicarbonates to liberate carbon dioxide gas, which performs the leavening function during the baking operation. It is also possible to prepare an anhydrous form of monocalcium orthophosphate by reaction of lime and phosphoric acid, however this material in the pure form also reacts comparatively rapidly. In order to control the rate at which carbon dioxide is liberated by leavening preparations, it has been proposed to coat the anhydrous or the hydrated orthophosphate with a protective film of various materials of an organic or inorganic nature in order to slow down the reaction between such orthophosphates and bicarbonates when reacting together in moist or wet dough.

The advantages of a leavening agent which, when reacted in a wet dough mixture, would liberate carbon dioxide gas at a slow rate have long been appreciated and numerous attempts have been directed to the production of such a material. The desirability of producing a material which would exhibit delayed or reserve leavening power and at the same time serve in the capacity of a mineral supplement is evident when it is considered that ordinary chemical leavening agents are used under a great variety of conditions and baking practices and may furthermore be used to augment dietary mineral deficiencies.

As regards the delayed or reserve leavening power, it may be said that if the time elapsed between the addition of aqueous fluids to the baking preparation and the rolling and cutting of the resulting dough be inordinately long, a relatively large proportion of the carbon dioxide liberated is lost and has no useful effect upon the raising of the baked product.

As regards the incorporation of minerals to supplement dietary deficiencies, it is known that certain milled cereal products contain a deficiency of minerals particularly, iron, and hence it has recently become the practice to add the deficient mineral to the cereal or food product in order to fortify the same in this respect. An example of such a cereal product ordinarily deficient, from a dietary standpoint in iron, is self-rising flour and also phosphated plain flour. In this case it is customary to add iron salts directly to such flours in the amount required to bring the iron level to that desirable for the balanced diet.

However the direct addition of iron salts to food products is fraught with some difficulty, because certain salts of iron accelerate the development of rancidity in the flour with which they are in contact and also result in the production of a yellow color, both of which results are undesirable.

We have now discovered that a monocalcium orthophosphate of the anhydrous form when produced under conditions such as are hereinafter described may be treated with an after-applied crystalline coating so as to yield a calcium phosphate leavening agent having excellent delayed or reserve leavening power and may be made to contain an iron salt content in stable, that is in sequestered or "locked-up" form. In accordance with our discovery we first react together lime or a lime base and orthophosphoric acid, preferably batchwise, although continuous methods may be used, in such a way as to produce a monocalcium orthophosphate containing a substantial amount of unreacted or free phosphoric acid. This preliminary reaction is preferably carried out in such a way that in the neighborhood of 90% more or less of the phosphoric acid is combined with lime producing monocalcium orthophosphate.

In general the reaction of phosphoric acid and lime may be carried out to produce either hydrated monocalcium orthophosphate or the anhydrous compound, or a mixture of the monohydrated and the anhydrous compounds may be produced. For the present purpose we prefer to produce the anhydrous salt. When the reacting conditions are such as to produce a temperature under say 135° C., substantially only the monohydrated salt is formed. If the temperature is in excess of 135° C. and below 175° C. we produce substantially pure anhydrous monocalcium orthophosphate. We obtain these higher temperatures by the use of strong phosphoric acid, that is acids having a content of at least 75% $H_3PO_4$. In general it may be said that the lower temperatures and lower acid concentrations tend to produce the monohydrated salt while higher temperatures and higher acid concentrations produce the anhydrous salt. The temperatures obtained are dependent on the amount of water in the reacting mix by which we mean that lower temperatures may be produced by the addition of water to the reacting mass and conversely higher temperatures may be produced by withholding water from the reacting mass or by applying external heat to the reacting mass itself, or to the reacting ingredients prior to introduction into the process.

By withholding a portion of the lime prior to reaction we obtain a formation of monocalcium orthophosphate crystals of high neutralizing value and of optimum shape and size so that we may, by subsequent treatment thereof, produce a finished leavening acid of proper sizing. By proceeding in this manner we are enabled to avoid the formation of substantial amounts of dicalcium orthophosphate which may be the cause of a low neutralizing value in the product. The term neutralizing value as herein used means the parts of sodium bicarbonate which will be neutralized by 100 parts of acid phosphate.

Having produced the monocalcium orthophosphate, in the anhydrous form as above described, containing a substantial amount, say from 1% to 20% of free phosphoric acid, and while said material is still in the preliminary mixer we add an amount of a hydrated oxide of a metal of the group consisting of iron and aluminum such as aluminum hydrate or iron hydrate or mixtures thereof, slightly in excess of the chemical equivalent to form diferric and dialuminum orthophosphates with the residual free phosphoric acid in the product. By employing aluminum hydrate or ferric hydrate or mixtures thereof we produce a coating or deposit upon previously formed crystals of monocalcium phosphate, which deposit we have found to be protective in nature. The aluminum hydrate or mixtures thereof with iron hydrate, or even the iron hydrate alone which should be added after the formation of the anhydrous monocalcium phosphate crystals reacts with the free acid to form a coating of aluminum or iron phosphates or mixtures thereof upon the crystals, which serves to protect the product against the deleterious action of moisture, whether present in the atmosphere or in the flour with which the product may be mixed to produce a self-rising flour. Minor amounts of aluminum and iron dissolved in the phosphoric acid employed in making the monocalcium phosphate as in prior art processes do not function to give the protection necessary for the present purposes.

As used in the specification and claims a substantial amount of free phosphoric acid is that amount which when reacted with aluminum hydrate alone or mixed with ferric hydrate as hereinafter disclosed, yields such a quantity of precipitated aluminum or iron phosphates deposited upon the monocalcium phosphate as will afford protection against the deleterious effects of moisture, and which will also cause a slowing down of the initial leavening rate when the product is employed as a baking acid. In general, to be satisfactory as a baking acid, especially in the production of self-rising flour, the product should, after storage of such flour for a period of eight weeks still contain 80% of its original carbon dioxide, and still possess available carbon dioxide (10 minutes minus 2 minutes) amounting to 50% of its original available gas.

The amount of free acid left in the product, which is later to be reacted with the trivalent iron and aluminum hydrate, may vary from a lower limit of about 1% to as much as 20% or 25%. Satisfactory results have been obtained for example with 1%, 2%, 3%, 5%, 10%, 15% and 20% free acid with the most favorable results being obtained in the neighborhood of 8% to 12% free acid, as far as the stability towards the action of humid atmospheres is concerned.

The total amount of aluminum and iron hydrate is proportioned in accordance with the free acid in the material as hereinafter stated, using a slight excess over that required for the formation of the dibasic orthophosphates of these metals. The aluminum and iron oxide content of the product may accordingly vary somewhat as follows, for the products mentioned above:

| Percent free acid prior to adding the metal hydrate | 1 | 2 | 3 | 5 | 10 | 15 | 20 |
|---|---|---|---|---|---|---|---|
| Percent $Al_2O_3$ contained in finished product, when aluminum hydrate alone is used | 0.65 | .70 | .84 | 1.75 | 3.5 | 4.2 | 7.0 |
| Percent $Fe_2O_3$ contained in finished product, when ferric hydrate alone is used | 1.00 | 1.00 | 1.32 | 2.75 | 5.5 | 6.6 | 11.0 |

The preferred form of our product is that employing either all aluminum hydrate or mixtures of aluminum hydrate with minor amounts of ferric hydrate, a preferred mixture being that employing a replacement of 5% to 50% of the alumina in the mixture with iron.

Our product may be protected by a coating of pure aluminum pyrophosphate crystals resulting from the dehydrating of aluminum orthophosphate upon the anhydrous monocalcium orthophosphate or by mixtures of ferric pyrophosphate with aluminum pyrophosphate. While various proportions of ferric and aluminum pyrophosphate may be employed and good moisture resistance obtained, for most cases of flour fortification with iron salts it has been found that if the $R_2O_3$ (by which is meant the compounds: $Fe_2O_3$ and $Al_2O_3$ collectively) content of the leavening agent is in the neighborhood of 3.5%, it is only necessary that about 10% of this amount be $Fe_2O_3$ while the remaining 90% may be alumina. The amount of $R_2O_3$ should be proportioned to react completely with about 10% of free acid in the monocalcium orthophosphate, giving a composition composed approximately as follows:

Percent free acid prior to adding $R_2O_3=10\%$.

Percent $Fe_2O_3$, content in finished product = 0.55%.

Percent $Al_2O_3$, content in finished product = 3.15%.

For the other cases of flour fortification where because of a deficiency of natural iron in the flour and where a larger proportion of added iron is desirable without increasing the monocalcium phosphate content, we may increase the proportion of $Fe_2O_3$ in the $R_2O_3$ mixture accordingly. Thus the $R_2O_3$ may consist of mixtures of the hydrates of alumina and iron equivalent to mixtures of the ferric oxide, $Fe_2O_3$ and aluminum oxide, $Al_2O_3$ in the following proportions:

| $Al_2O_3$ percent | 90 | 80 | 70 | 60 | 50 | 40 | 30 | 20 | 10 |
|---|---|---|---|---|---|---|---|---|---|
| $Fe_2O_3$ percent | 10 | 20 | 30 | 40 | 50 | 60 | 70 | 80 | 90 | or various intermediate proportions may be used.

As stated the maximum stability is obtained within the neighborhood of 10% free acid, when treated in accordance with the present process. Decreasing free acid (and $R_2O_3$ in the product) makes for somewhat decreased stability, but gives a product with a higher neutralizing value. Increased free acid (and $R_2O_3$ in the product) above 10% also makes for somewhat decreased stability and furthermore results in a somewhat decreased neutralizing value.

In order to perfect a moisture resistant coating of the monocalcium orthophosphate particle carrying the precipitated aluminum or aluminum and iron phosphate salt, it is necessary that the product be treated by a curing process herein described. This process embodies a treatment under conditions favorable for the substantially complete reaction of the iron and aluminum oxide or hydrates with the free phosphoric acid to produce dialuminum or diferric orthophosphate $Al_2(HPO_4)_3$, $Fe_2(HPO_4)_3$ together with lesser amounts of other hydrolysis or reaction products. During the carrying out of this curing process a substantial rise in free acid occurs temporarily which by a continuation of the treatment is substantially diminished.

It is preferred to carry out the curing treatment by exposure of the mixer product already coated with reaction products of $Al_2O_3$ or $Fe_2O_3$ and $Al_2O_3$ with orthophosphoric acid to humid atmospheres of the order of 75% to 85% or even 95% relative humidity, referred to hereinafter by the letters RH at not too elevated a temperature. The temperature in fact may be substantially room temperature, that is from 15 to 30° C. or may even extend to temperatures of 50 to 60° C., but preferably less than 80° C. Lower humidities, in the neighborhood of 40% to 50% RH may be used however in this case the time required for curing is greatly increased.

After curing, the product will contain under 0.2% of free acid and may contain as little as 0.01% free acid, and is then subjected to a drying or dehydrating operation, for conversion of the aluminum or the iron and aluminum phosphate salts as by application of heat, while avoiding substantial loss of available acidity of the monocalcium orthophosphate for leavening purposes.

Since phosphate leavening agents are largely used in producing self-rising flour and furthermore since the phosphate is ordinarily added in the flour mill directly to warm moist flour, it is desirable that the moisture present in the flour not act upon the phosphate so as to increase the reaction rate. Consequently, it is necessary that either the phosphate itself be resistant towards moisture present in the flour, or that it be protected against the effects of moisture. Our product embodies such protection in the form of a moisture resistant after applied deposit or envelope. However we believe it to be not such an envelope as is wholly inert with respect to water vapor since we have found that when our product is exposed to humid atmospheres as when in admixture with self-rising flour we find that the moisture thus absorbed by the coating is so strongly retained therein that the pure normally hygroscopic anhydrous salt is unable to withdraw material amounts of moisture from the coating.

The following example illustrates the operation of one feature of our invention for the production of a leavening agent of the anhydrous monocalcium phosphate type:

EXAMPLE 1

To a stainless steel mixer provided with an efficient mixing and kneading mechanism and also provided with a steam jacket to permit heating the contents, introduce 24.4 oz. of —20+40 mesh quick lime containing 97.9% CaO and then add 268 oz. of 78.6% pure $H_3PO_4$, which acid has previously been heated to in the neighborhood of 130° C. The acid is added in two to three minutes and by reaction with the lime causes the temperature of the reacting mixture to rise rapidly, which temperature should reach at least 140° C. Then add 23 oz. of pulverized quick lime with the same lime content as above in approximately five minutes after which stir for an additional two minutes. The temperature thereupon rises to in the neighborhood of 148° C. Now add 12½ oz. of hydrated lime, $Ca(OH)_2$, containing 73.5% CaO, the addition being carried out over a period of five minutes, after which we stir an additional 15 minutes. The temperature during the stirring is in the neighborhood of 140° C. At this point we remove a small sample of the contents of the mixer and determine free $H_3PO_4$ in the product. This determination is made by extraction of the sample with acetone and titration of the extracting solution in known manner.

This example illustrates the preparation of our product on a relatively small scale. Actually of course, the preparation may be carried out upon a much larger scale by employing larger quantities of materials, due regard being given to controlling the temperatures encountered when employing such larger quantities.

Using the above procedure and proportions we find that the free $H_3PO_4$ content in the product is in the neighborhood of 10%. We now add 12.6 oz. of aluminum hydrate, $Al(OH)_3$, slowly over a period of 10 minutes, this amount of aluminum hydrate being that necessary to afford somewhat of an excess of the hydrate after reaction with free acid, for the production of dialuminum orthophosphate. Now stir for approximately 60 minutes. The temperature of the reacting mixture after two minutes of stirring is in the neighborhood of 128° C. and during stirring we may find it advisable to raise the temperature of the reacting mixture by the use of the steam jacket on the mixer itself, wherein steam under about 80 pounds pressure is supplied to the mixer jacket. The temperature of the reacting mixture after approximately 60 minutes is 146° C. and the material is then dumped out of the mixer. The product is approximately 15 pounds in weight and will contain from 0.3% to 0.5% of free $H_3PO_4$.

The product is now allowed to cool and then subjected to a curing operation which is carried out as follows:

The material as obtained from the mixer after cooling somewhat is placed in a mixing machine such as a rotary dough mixing machine wherein the product is agitated mechanically and simultaneously subjected to contact with moist air of say 75% to 95% RH at a temperature of 25° C. to 35° C. or even up to about 60° C., but preferably below 80° C. The rate at which the moist air is supplied to the 15 pound batch of material is approximately 100 to 130 cubic feet per hour, the time of treatment being from 5 to 7 hours, at 25° C. to 35° C. when the relative humidity is in the neighborhood of 85%. If the relative humidity is increased, the necessary curing time is decreased and inversely if the humidity is lowered, the time required is increased. The time of curing can be decreased by employing higher temperatures. The free acid in the product increases from an original value of 0.3% to 0.5% to as high as 0.6% to 0.8% as a result of this treatment and reaches the maximum value stated in 1½ to 2 hours. After the maximum free acid content is reached, the free acid gradually decreases and after the period of curing has been completed it may be as low as 0.1 to 0.2% or lower. During the curing operation just described and paralleling the increase in free acid as mentioned above, the product becomes damp and friable and appears to be somewhat moist. After the free acid is reduced in the product, the material becomes dry and considerably more free flowing. During the curing operation some heat is liberated and it has been observed that when curing with humid air at 30° C. the material may reach a temperature of 44° C. to 46° C. or 50° C. This heat is presumably due to the hydrolysis and reaction of the aluminum compounds with the free acid. The heat is desirably removed by keeping the walls of the mixer, in which the operation is carried out, cool as by contact with cold water.

The curing operation is substantially complete when the free acid in the product has been reduced to under 0.2% and preferably under 0.1%. When this stage is reached add to the product in the mixer ½ of one percent of finely divided tricalcium phosphate of the grade commercially used as a salt conditioner.

Upon the addition of the tricalcium phosphate the product becomes very dry and free flowing, and after stirring for 4 or 5 minutes the material may be removed from the mixer.

According to our present understanding of the curing process, the first reaction which takes place between the aluminum hydrate and phosphoric acid is as follows:

$$Al(OH)_3 + 3H_3PO_4 \rightleftarrows Al(H_2PO_4)_3 + 3H_2O$$

which is a reversible reaction and which is influenced unfavorably, as far as the production of the monoaluminum phosphate is concerned, by the presence of too much free water. This reaction we believe to take place substantially in the mixer and is favored by conditions allowing escape of the formed water. At the same time due to the presence of an excess of aluminum hydrate, some dialuminum orthophosphate is also formed, either by a direct reaction of aluminum hydrate and acid or by subsequent reaction of the acid aluminum phosphate with the $Al(OH)_3$ as follows:

$$Al(H_2PO_4)_3 + Al(OH)_3 \rightleftarrows Al_2(HPO_4)_3 + 3H_2O$$

Or the following reaction may take place with the formation of aluminum diorthophosphate, $AlH_3(PO_4)_2$, probably simultaneously with the above reaction:

$$2Al(H_2PO_4)_3 + Al(OH)_3 \rightleftarrows AlH_3(PO_4)_2 + 3H_2O$$

Following the formation of some small amount of dialuminum orthophosphate and aluminum diorthophosphate initially, as part of the first formed aluminum hydrate-phosphoric acid reaction product, an additional quantity of this compound is produced upon storage, and moreover its formation is considerably accelerated and the reactions leading to its formation greatly favored by the herein disclosed curing operation. The crystalline dialuminum phosphate and the aluminum diorthophosphate are the desired end products of the curing reaction.

The rise in the free acid content of the product undergoing curing may be accounted for by the hydrolysis of the monoaluminum orthophosphate, in the presence of moisture to form more basic acid phosphates of the types having a basicity lying between acid aluminum orthophosphate, $Al(H_2PO_4)_3$ and trialuminum orthophosphate, $AlPO_4$, thus:

1. $$Al(H_2PO_4)_3 \underset{}{\overset{H_2O}{\rightleftarrows}} AlH_3(PO_4)_2 + H_3PO_4$$

2. $$2Al(H_2PO_4)_3 \underset{}{\overset{H_2O}{\rightleftarrows}} Al_2(HPO_4)_3 + 3H_3PO_4$$

The free acid then liberated will subsequently react with the more basic materials, as for example:

$$AlPO_4 + H_3PO_4 \rightarrow AlH_3(PO_4)_2$$

Both reactions 1 and 2 above, occur simultaneously, the second of these is especially favored by high temperatures and high humidities during curing.

Some trialuminum phosphate, $AlPO_4$, may also be formed as a result of the chemical equilibria of the several reactions herein described; and may exist as such in the final product.

The final dehydrating or drying treatment to which the product is subjected as described below results in the conversion of the aluminum phosphates to the corresponding pyrophosphates at temperatures above 180° C. thus:

$$2Al_2(HPO_4)_3 \rightleftarrows Al_4(P_2O_7)_3 + 3H_2O$$

and simultaneously also causes a pyrophosphate to be formed from the residual monobasic aluminum orthophosphate thus:

$$2Al(H_2PO_4)_3 \rightleftarrows Al_2H_6(P_2O_7)_3 + 3H_2O$$

The compound $AlH_3(PO_4)_2$, upon heating reacts as follows:

$$4AlH_3(PO_4)_2 \rightleftarrows Al_4(P_2O_7)_3 + 2H_3PO_4 + 3H_2O$$

The acid thus liberated reacts with the excess base present as $AlPO_4$ or $Al(OH)_3$.

When ferric hydrate is employed alone or in conjunction with aluminum hydroxide, the reactions taking place between the free acid and ferric hydrate are substantially similar, the curing operation resulting in the formation of a coating of crystalline diferric orthophosphate: $Fe_2(HPO_4)_3$ or $FeH_3(PO_4)_2$ which upon heating transform to the corresponding crystalline ferric pyrophosphate $Fe_4(P_2O_7)_3$.

Fortunately iron and aluminum phosphates form series of crystalline solid solutions with each other. That is Al may be replaced by Fe in the crystal lattice of the aluminum phosphates, and Fe may be replaced by Al in the lattice of the ferric phosphates with only a regular continuous and linear change of the lattice dimensions. However, the crystal forms of the aluminum and ferric phosphates are different, hence in a continuous series where one metal is being increased in the phosphates at the expense of the other metal, the regularity of form persists until the 50%–50% mol composition is reached at which point the crystal system changes over to the other form. This relationship holds with regard to the phosphates herein involved, i. e., the mono, di and tri basic orthophosphates and also the corresponding pyrophosphates of aluminum and iron. We may accordingly modify the aluminum phosphate coating by the incorporation of ferric phosphate therein by simultaneous reaction of the respective oxides or hydrates, without impairing the protective nature of the crystalline coating. Moreover iron combined in this manner is available for supplying dietary deficiencies without causing an acceleration of rancidity development in flour or other cereal prodcts.

The final coating produced by the herein described process consists of a mixture of the acid and normal pyrophosphates of aluminum together with some trialuminum orthophosphate or of iron or of solid solutions (mixed crystals) of these phosphates. The acid aluminum and iron pyrophosphates being somewhat water soluble will react with bicarbonate to liberate the leavening gas, carbon dioxide.

In order to initiate and to carry forward the series of reactions mentioned above we have found that it is necessary to expose the product carrying free acid and metal hydrate as preliminarily reacted as described, to a humid atmosphere wherein the humidity ranges between 75% and 85% or 95% RH and even to substantial saturation at not too elevated a temperature. The temperature may be substantially room temperature, that is in the range of 15° C. to 35° C. or even as high as 55° C. or 60° C., preferably remaining below 80° C., however because of unfavorable effects encountered above this temperature.

The product which now contains some absorbed and combined water is ready for the final dehydrating treatment which we do by subjecting the material to heat at a temperature above 180° C. and below 220° C., preferably within the range of 210–220° C. for a period of from 2 to 6 hours, or for such time as to form aluminum phosphates or aluminum and iron phosphate of decreased water content without substantial loss of acidity for leavening purposes. The heating may be carried out in a tray drier or in a rotary device in which the heat may be supplied as hot air in direct contact with the material itself. It is desirable that the air in contact with the material be not too humid as in this stage it is necessary that moisture readily escape from the product. The drying step also converts aluminum and iron compounds present to a variety of bodies having a lower content of water. The aluminum and iron compounds formed are the crystalline tri aluminum and tri ferric orthophosphate, normal aluminum pyrophosphate, normal ferric pyrophosphate and acid aluminum and ferric pyrophosphate all of which may be present in the coating deposit on the crystals. The protection against premature reaction with water vapor is afforded by a crystalline aluminum or ferric pyrophosphate, $Al_4(P_2O_7)_3$, $Fe_4(P_2O_7)_3$, associated with other aluminum and ferric phosphates.

The type of aluminum hydrate utilized in our process is preferably a commercial product known as "activated alumina," and is characterized by possessing a low density and a particle size of 0.01 to 0.5 micron. The product contains in the neighborhood of 34% to 35% chemically combined water and in addition a small amount, usually 0.9 to 1.0 percent of free or uncombined $H_2O$. Chemically the material corresponds to the formula $Al_2O_3.3H_2O$.

The type of ferric hydrate utilized in our process is preferably a precipitated product made by precipitation of a soluble ferric compound such as $FeCl_3$ with a base such as $NH_3$. The precipitate should be washed fairly free of contaminating salts and may then be somewhat dried to the point where it still contains from 10% to 20% $H_2O$. The crystal size of the product will be submicroscopic, i. e., less than 1 micron.

The screen size of our product is subject to some control as the crystals are being formed during the mixing operation. In general we obtain a smaller crystal by employing an excess of acid and also by accelerating the rate of cooling during crystallization. However we prefer to screen the product after drying through a 150 mesh screen using the product passing this screen directly as the preferred form of leavening agent. The oversize may be crushed down by passing through a suitable mill, as we find that the humectant property (moisture resistance) is only slightly decreased by such treatment. If desired the product may be screened prior to the final heat treatment, the oversize, which is largely agglomerated material being crushed to pass 150 or 200 mesh and then combined with the fines after which the entire product is heated. Should we find it desirable to screen after heating, then the oversize alone may be reheated and the humectant thereby improved.

Our product as thus prepared comprises crystalline anhydrous monocalcium orthophosphate protected by a previous deposit of superimposed substantially insoluble crystalline or submicrocrystalline aluminum or aluminum and ferric phosphates which crystalline deposit has the property of absorbing and retaining moisture to such an extent that the underlying monocalcium orthophosphate, in the anhydrous state is preserved in a substantially anhydrous condition. The crystalline deposit of aluminum phosphates upon the crystals, of which aluminum pyrophosphate is a major and principal constituent, is oriented with respect to the underlying monocalcium phosphate crystal so as to exhibit a parallel extinction in polarized light which differs from the extinction of the anhydrous monocalcium phosphate itself, which exhibits non-parallel extinction. The deposit is somewhat patch-like and in some places is quite thin. The edges of the crystals are sharp and well defined, with no indication of fusion or sintering. There is no glassy or vitreous coating on the crystals.

Our leavening agent as thus produced possesses a pronounced ability to resist the reaction of moisture as illustrated by the following dough reaction rates made upon a leavening composition containing sodium bicarbonate, the reaction rates being taken before and after exposure of the leavening acid itself to a moist atmosphere of 75% RH at 30° for 72 hours.

*Dough reaction rate aluminum phosphate bearing material 200 mesh material—per cent of total $CO_2$ liberated (soda blank deducted)*

|  | Time, minutes | | | | | | |
| --- | --- | --- | --- | --- | --- | --- | --- |
|  | 1 | 2 | 3 | 4 | 5 | 10 | 15 |
| BEFORE EXPOSURE TO MOIST AIR | | | | | | | |
| $CO_2$ percent | 1.7 | 5.6 | 13.8 | 28.5 | 38.5 | 51.0 | 52.3 |
| AFTER EXPOSURE TO AIR OF 75% RH, AT 30° FOR 72 HRS. | | | | | | | |
| $CO_2$ percent | 7.1 | 14.2 | 27.5 | 40.8 | 44.3 | 50.7 |  |

The dough reaction rate is measured substantially according to the method described in Cereal Chemistry, vol. 8, page 423, 1931.

From the above values it may be calculated that the "available" $CO_2$, by which we mean the 10' minus the 2' value in the above table, decreases from an original value of 45.4% only to 36.5% after humidification. Products protected by other means show a decrease down to as little as 12.0% after humidification. A decrease in "available" leavening gas is caused by a premature hydration of the anhydrous monocalcium phosphate, causing a greater generation of gas during the first two minutes, that is during a period when it may readily be lost from the dough.

Upon baking our product by a modification of the American Association of Cereal Chemists' standard biscuit procedure, we obtain as an example, the following specific and actual volumes of biscuit. The table below shows these values for immediate baking, for a two minute delay before rolling and cutting, and for a four minute delay before rolling and cutting of the dough, utilizing the aluminum phosphate bearing material:

*Baked at neutralizing value of 83.5*

| Dough delay minutes | 0 | 2 | 4 |
|---|---|---|---|
| Specific volume of biscuits cc./gr | 2.32 | 2.34 | 1.91 |
| Actual volume of biscuits cc | 66.3 | 60.0 | 52.5 |

As illustrated by the above figures, this product possesses a valuable degree of reserve leavening or tolerance towards premature reaction in the cold dough as indicated by the slowness with which gas is liberated from the wet dough mixture, resulting in the retention of leavening values by the dough up to the time that the heat of baking liberates the gas. The application of heat as in baking however causes a rapid acceleration of rate of liberation of carbon dioxide.

We may also produce our leavening agent by subsequently adding the excess of acid to a previously formed monocalcium orthophosphate, of the anhydrous type. When proceeding in this manner, we first produce the desired anhydrous monocalcium orthophosphate in known manner without using the excess acid described above. We thus obtain a fine crystalline product of substantially pure monocalcium phosphate and in which the $P_2O_5/CaO$ ratio is substantially that of the pure salt, that is in the neighborhood of 2.54. We may at times employ an excess of lime, in which case some dicalcium and possibly some tricalcium orthophosphate may appear in the product.

To this substantially pure monocalcium orthophosphate, preferably while still in the mixer, in which it was formed, we now add enough pure orthophosphoric acid to yield approximately 10% of free acid, more or less, in the product. The quantity of acid added may vary somewhat over a range of from say 2% or 3% to a preferred 10% to as much as 12% to 15%, or even more may be used. We then treat the acidified product with aluminum hydrate, $Al(OH)_3$, as above described. The procedure thereafter is substantially similar to that disclosed in the example above.

A typical chemical analysis of our product may be as follows:

| | | |
|---|---|---|
| CaO | per cent | 20.02 |
| $P_2O_5$ | do | 61.9 |
| $P_2O_5/CaO$ ratio | | 3.09 |
| Ignition loss | per cent | 14.15 |
| $SO_3$ | do | .03 |
| $Fe_2O_3$ | do | .039 |
| $Al_2O_3$ | do | 3.50 |
| F | parts per million | 14 |
| Pb | do | 0.9 |
| Total alkali metal oxide | per cent | .08 |

For the production of the moisture resistant coating upon the anhydrous monocalcium orthophosphate, we may add a previously made mixture of the dry aluminum or iron and aluminum hydrates in the proper proportion, to the anhydrous monocalcium orthophosphate containing the preferred amount of free phosphoric acid, or we may add either hydrate separately to the phosphate. A procedure which we prefer to follow when the phosphate is to be treated with both iron and aluminum hydrate is to add the iron first and permit it to react substantially completely to produce the light colored iron phosphates and then we add the aluminum hydrate. By this means we obtain a product substantially free of the red ferric color. The product is then further treated by our curing and drying step as already discussed above.

Another form which our process may take is that involving the dissolution of the iron alone in the acid prior to the addition of the lime, and then the formation of the monocalcium phosphate crystals from the iron containing acid. When this means is employed the iron bearing monocalcium phosphate crystals may be formed containing the required excess amount of free acid, the free acid is then reacted with aluminum hydrate, and a substantially iron-free aluminum phosphate coating upon the crystals, formed in the herein described manner.

By employing this variation of our process the iron phosphate is retained within the monocalcium phosphate crystals in essentially soluble form and is not concentrated upon the surface of such crystals. Protection is afforded by the after applied aluminum phosphate coating as already described. By proceeding in this manner, a product may be obtained containing dietary significant amounts of iron in a sequestered form, so that acceleration of rancidity development, due to iron, is completely inhibited.

Since pure phosphoric acid as produced by the combustion of pure phosphorus is used, the product will in general contain only those minor impurities occurring in the lime and in the iron and aluminum hydrate and to a greatly lessened degree in the acid itself as compared with known products of this type.

Our product is essentially free of alkali metals, that is the content of these metals is under 0.1% and usually in the neighborhood of .08% including both sodium and potassium oxides.

Employing the product of Example 1 above as the acid leavening in a self-rising flour or baking powder, the proportions would be substantially as follows:

*Self-rising flour*

| | Parts |
|---|---|
| Flour | 100 |
| Sodium bicarbonate | 1.25 |
| Acid leavening | 1.50 |
| Sodium chloride | 2.00 |

*Baking powder*

| | Parts |
|---|---|
| Sodium bicarbonate | 28.00 |
| Acid leavening | 33.50 |
| Starch | 38.50 |

This application is a continuation-in-part of our copending application, Serial No. 356,034, filed September 9, 1940.

Having now particularly described our invention and the manner of making and using the same, we desire that no unnecessary limitations be placed thereupon, except as indicated by the appended claims.

What we claim is:

1. A process for producing a monocalcium orthophosphate leavening composition, comprising mixing crystalline anhydrous monocalcium orthophosphate containing between 1% and 20% of free phosphoric acid with such an amount of hydrated metal oxide selected from the class consisting of aluminium and ferric hydrates so as to neutralize said free acid for the production substantially of dibasic orthophosphate therewith, reacting said hydrated metal oxide and said free acid to form, upon said monocalcium orthophosphate crystals, a coating of metal orthophosphate having a basicity lying between the monobasic and tribasic orthophosphates of said metal hydrate, and then dehydrating said coating sufficiently to convert said metal orthophosphate to pyrophosphate, while avoiding substantial loss of available acidity of said leavening composition.

2. The process as defined in claim 1, in which the monocalcium orthophosphate contains between 2% and 15% of free phosphoric acid.

3. A process for producing a monocalcium orthophosphate leavening composition, comprising mixing crystalline anhydrous monocalcium orthophosphate containing between 5% and 15% of free phosphoric acid with such an amount of dry $R_2O_3$ hydrate, where R is a metal of the class consisting of aluminium and ferric iron, as to furnish between 1.75% and 6.6% $R_2O_3$ in the leavening composition, said $R_2O_3$ being proportioned to said free acid as to form a dibasic phosphate, $R_2(HPO_4)_3$, reacting said hydrate with said free acid to produce orthophosphates having a basicity lying between $R(H_2PO_4)_3$ and $RPO_4$ coated upon said crystals and to reduce said free acid to less than 0.4% in said mixture, exposing said coated crystals to an atmosphere containing water vapor and reducing the free acid to under 0.2%, and then heating said coated crystals to a temperature effective to convert said orthophosphates of basicity between $R(H_2PO_4)_3$ and $RPO_4$ to pyrophosphate, while avoiding substantial loss of available acidity of said leavening composition.

4. The process as defined in claim 3 in which the anhydrous monocalcium phosphate contains in the neighborhood of 10% of free phosphoric acid.

5. The process as defined in claim 3, in which the coated crystals are exposed to an atmosphere containing water vapor, said atmosphere having a relative humidity of from 50% to 95%.

6. The process defined in claim 3 in which the average particle size of the $R_2O_3$ hydrate ranges upwardly to 1.0 micron.

7. A process for producing a coating on crystals of anhydrous monocalcium orthophosphate, comprising adding to anhydrous monocalcium orthophosphate containing from 1% to 20% of free phosphoric acid such an amount of hydrated metal oxide selected from the class consisting of aluminium and ferric hydrates, so as to neutralize said free acid for the production substantially of dibasic orthophosphate therewith, reacting said hydrated metal oxide and said free acid in a humid atmosphere, to form upon said monocalcium orthophosphate crystals, a coating of metal orthophosphate having a basicity lying between the monobasic and tribasic orthophosphates of said metal hydrate and then dehydrating said coating, sufficiently to convert said metal orthophosphate principally to pyrophosphate.

8. A process of producing a monocalcium orthophosphate leavening composition, comprising reacting orthophosphoric acid with a lime base under conditions to produce a substantially pure crystalline anhydrous monocalcium orthophosphate, the amount of lime base being proportioned so that the monocalcium orthophosphate after reaction contains in the neighborhood of 8% to 12% of free phosphoric acid, mixing with said monocalcium phosphate, an amount of aluminum hydrate proportioned substantially to produce with said free acid, dialuminum orthophosphate, exposing said mixture to a humid atmosphere until said free acid has been reduced to under 0.2% and to produce aluminum phosphates having a basicity intermediate between $Al(H_2PO_4)_3$ and $Al(PO_4)$, thereupon heating said product for a period of time and at a temperature to convert said aluminum orthophosphates to aluminum pyrophosphate, while avoiding substantial loss of available acidity of said leavening composition.

9. The process as defined in claim 8, in which the aluminum hydrate mixed with the monocalcium orthophosphate comprises: $Al_2O_3.3H_2O$.

10. A monocalcium orthophosphate leavening composition, comprising anhydrous monocalcium orthophosphate crystals, said crystals having surfaces carrying a protective crystalline coating comprising principally pyrophosphates of a metal of the class consisting of aluminum ferric iron and mixture thereof, said composition containing the equivalent of between 0.65% and 11% of the oxides of said metal.

11. A product defined in claim 10 in which the protective coating comprises the normal pyrophosphate, the acid pyrophosphate and the tribasic orthophosphate of a metal of the said class.

12. A monocalcium orthophosphate leavening composition, comprising anhydrous monocalcium orthophosphate crystals, said crystals having surfaces carrying a protective crystalline coating comprising principally pyrophosphates of aluminum and ferric iron, in amount sufficient to effectively protect said anhydrous monocalcium orthophosphate against hydration by humid atmospheres, said composition containing the equivalent of between 1.75% and 6.6% of the oxides of aluminum and iron.

13. An anhydrous monocalcium orthophosphate composition containing a protective coating, comprising anhydrous monocalcium orthophosphate crystals, said crystals having surfaces carrying a coating comprising principally pyrophosphates of a metal selected from the group consisting of aluminium and ferric iron, said coated product containing the equivalent of 1.75 to 6.6% of the oxides of said metal, and said coating effectively protecting said anhydrous monocalcium orthophosphate against hydration.

14. The produce defined in claim 12 containing under 0.1% alkali metal oxide.

15. A monocalcium orthophosphate leavening composition, comprising pure anhydrous moncalcium orthophosphate crystals, said crystals having surfaces coated principally with a deposit of crystalline aluminum pyrophosphate, said aluminum pyrophosphate protecting the underlying anhydrous monocalcium orthophosphate against hydration, said composition containing the equivalent of between 1.75% and 4.2% $Al_2O_3$.

16. The composition defined in claim 15 in which the composition contains the equivalent of approximately 3.5% $Al_2O_3$.

17. A monocalcium orthophosphate leavening composition comprising anhydrous monocalcium orthophosphate crystals, said crystals carrying a protective crystalline coating consisting principally of aluminum pyrophosphate, aluminum acid pyrophosphate and trialuminum orthophosphate, said coating effectively protecting said anhydrous monocalcium phosphate against hydration, said composition containing the equivalent of approximately 3.5% $Al_2O_3$ combined as said aluminum phosphates, said aluminum phosphate crystals being oriented with respect to said underlying monocalcium phosphate crystals so as to show, when viewed with polarized light, a point of extinction distinct from that of said monocalcium orthophosphate.

18. A monocalcium orthophosphate leavening composition comprising anhydrous monocalcium orthophosphate crystals containing iron phosphate in minor amount, and carrying a protective crystalline coating consisting principally of aluminium pyrophosphate, said leavening composition containing the equivalent of 1.75% to 4.2% of $Al_2O_3$, said coating effectively protecting said anhydrous monocalcium orthophosphate against hydration and said iron phosphate against accelerating rancidity development of cereal products containing said leavening composition.

W. WALKER LEWIS, JR.
*Administrator of the Estate of William W. Cobbs, Deceased.*

CARROLL A. HOCHWALT.